United States Patent [19]
Warner

[11] Patent Number: 5,782,737
[45] Date of Patent: Jul. 21, 1998

[54] METHOD OF FOLDING A VEHICLE SAFETY AIRBAG

[75] Inventor: Larry R. Warner, Livonia, Mich.

[73] Assignee: Ford Global Technologies, Inc., Dearborn, Mich.

[21] Appl. No.: 688,631

[22] Filed: Jul. 29, 1996

[51] Int. Cl.⁶ .................................................. B60R 21/16
[52] U.S. Cl. ........................ 493/405; 493/314; 493/450; 493/451; 493/940
[58] Field of Search ................................. 493/243, 250, 493/251, 255, 256, 257, 258, 259, 262, 309–314, 405–407, 418, 450, 451, 456, 457, 458, 464, 940, 260, 958, 310

[56] References Cited

U.S. PATENT DOCUMENTS

| | | |
|---|---|---|
| 2,123,175 | 7/1938 | Balsam . |
| 2,347,086 | 4/1944 | Curtiss . |
| 2,625,082 | 1/1953 | Wight . |
| 2,680,998 | 6/1954 | McMillan . |
| 2,687,678 | 8/1954 | Rowland . |
| 2,696,768 | 12/1954 | Mickey . |
| 2,709,950 | 6/1955 | Foster . |
| 3,451,694 | 6/1969 | Hass . |
| 3,792,873 | 2/1974 | Buchner et al. . |
| 4,235,453 | 11/1980 | Lawson . |
| 4,430,772 | 2/1984 | Michel et al. . |
| 5,176,400 | 1/1993 | McGuire et al. . |
| 5,186,492 | 2/1993 | Wright et al. . |
| 5,215,795 | 6/1993 | Matsumoto et al. . |
| 5,300,011 | 4/1994 | Budde ........................... 493/405 |
| 5,360,387 | 11/1994 | Baker . |
| 5,391,137 | 2/1995 | DePoy et al. . |

*Primary Examiner*—Joseph J. Hail, III
*Assistant Examiner*—Christopher W. Day
*Attorney, Agent, or Firm*—Daniel M. Stock

[57] ABSTRACT

A vehicle safety airbag is folded to an annular compact accordion-like configuration for placement around a conventional bag inflator. The bag folding operation involves axially stretching the bag, restraining localized areas of the stretched bag against radial expansion, and axially compressing the bag while moving the restraining devices together, such that annular accordion-like folds are formed in the bag.

7 Claims, 3 Drawing Sheets

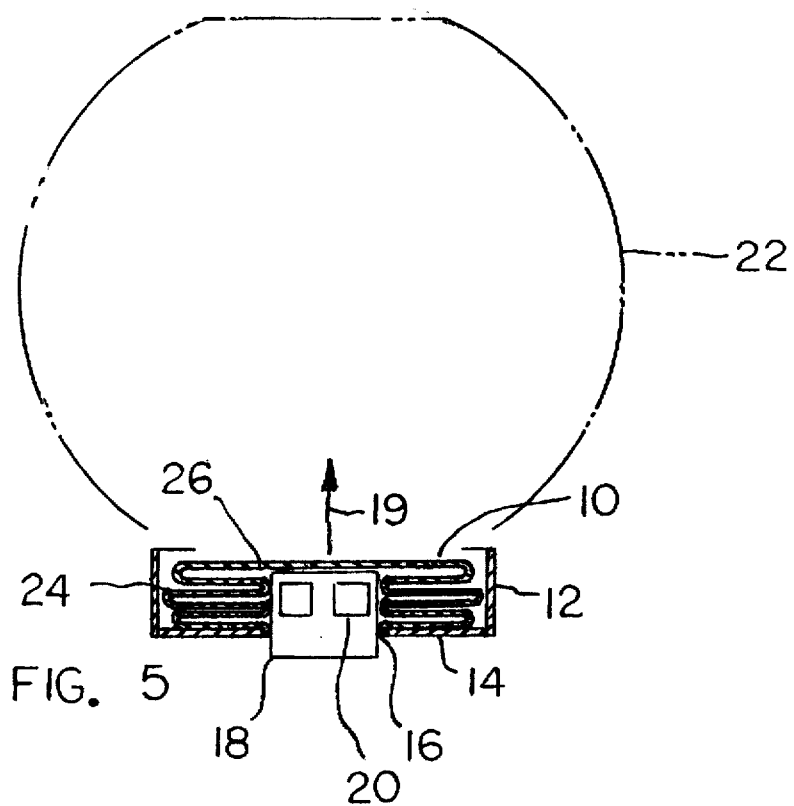

METHOD OF FOLDING A VEHICLE SAFETY AIRBAG

FIELD OF THE INVENTION

This invention relates to vehicle safety airbags, and particularly to a method of folding an airbag into a compact annular configuration sized to surround an airbag inflator.

SUMMARY OF THE RELATED PRIOR ART

Inflatable airbags are sometimes deployed in vehicles, especially automobiles and trucks, to protect the driver and front passenger in the event of a front collision that would tend to throw the vehicle occupant toward the dashboard and windshield. Typically, the driver side airbag is deployed in the steering wheel in a folded state proximate to an air inflator buried within the steering wheel or steering column. The passenger side airbag is located within a housing in the dashboard.

The present invention is concerned particularly with the deployment of the driver side airbag. More particularly, the invention relates to a method of folding a driver side airbag so that the bag is formed into plural annular folds adapted to surround the associated airbag inflator.

One conventional airbag inflator comprises a cylindrical housing having a flat end wall and a ring of gas escape ports in the cylindrical side wall; typically the cylindrical side wall has a diameter of about three or four inches. Conventional driver side airbags are folded in zigzag fashion to form multiple folds positionable against the end wall of the inflator housing.

With such an orientation of the folded airbag, the bag inflation process tends to produce a mushroom configuration in the transitory partial inflation stage. The air pressure force travels through the partially opened folds of the bag in an irregular manner to produce a relatively narrow stem and a bulbous leading end; the unfolding process is somewhat unpredictable.

Another disadvantage of the conventional method of airbag folding is that the multiple folds add to the axial dimension of the airbag inflator so that it becomes difficult to recess the center area of the steering wheel rim. The inflator-bag assembly has an undesirable large axial dimension.

U.S. Pat. No. 5,360,387, issued to William baker is representative of the prior art method of folding an airbag. As shown in FIG. 18 of U.S. Pat. No. 5,360,387, the bag is folded in zigzag fashion atop a base plate; the base plate could, in practice, be located proximate to the end wall of an airbag inflator, whereby pressurized gas travels from the inflator through the base plate into the folded areas of the bag. The gas pressure travels through the folds to unfold the bag folds while the bag is being inflated. The unfolding process is irregular and uneven.

SUMMARY OF THE INVENTION

The present invention relates to a method of folding a vehicle safety airbag so that the bag has plural annular folds adapted to encircle the associated airbag inflator. The folded bag has a single fold connector wall spanning the end surface of the inflator. The folded walls of the bag surround the inflator without increasing the axial thickness dimension of the inflator. Therefore the bag-inflator assembly has a pancake configuration that enables the assembly to fit within a recessed central area of a steering wheel so as to achieve a dished steering wheel exterior surface. This is a major feature of the invention.

A principal advantage to the invention is that during the bag inflation process the gas pressure is initially applied directly to the connector wall that spans the end surface of the inflator. The connector wall (spanning the annular folds) leads the way out of the bag storage space, so that the bag progressively expands in multiple directions, similar to the action that takes place when a person breathes into a deflated toy balloon to expand it from a relatively small spherical configuration into a larger spherical configuration. By using the spherical airbag expansion action, the bag provides some measure of shock-absorption protection at a relatively early stage of the expansion process, i.e. prior to full inflation of the bag.

Typically, the full inflation cycle requires about thirty-five milliseconds. The first eight milliseconds (approximately) is used to produce ignition of the chemical in the inflator. At that point the inflator begins to generate a pressurized combustion gas, to start the bag inflation process. The gas pressure builds and travels into the bag to produce full bag inflation at about the thirty five millisecond time interval.

With the bag folding method of the present invention the bag expands progressively in a predicted fashion from a relatively small sphere size to a larger sphere size. With some prior art bag-folding methods, the bag inflation process causes the zigzag folds to progressively unfold in a irregular fashion. The present invention comtemplates a bag folding method that results in a predictable orderly expansion of the bag when required. The invention is believed to be an advance in the art.

The bag is folded to have a series of accordian-like annular folds connected to a single connector wall at one end of the bag. With this method of folding the airbag has a relatively compact axial dimension that is adapted to surround the bag inflator. The bag-inflator assembly fits readily into a central resessed area of a steering wheel.

Further advantages and features of the invention will be apparent from the attached drawings and description of an illustrative embodiment of the invention.

BRIEF DESCRIPTION OF THE DRAWINGS

FIG. 5 is a sectional view taken through a folded bag produced by the FIG. 1 apparatus.

DETAILED DESCRIPTION OF A PREFERRED EMBODIMENT

Figure 1:
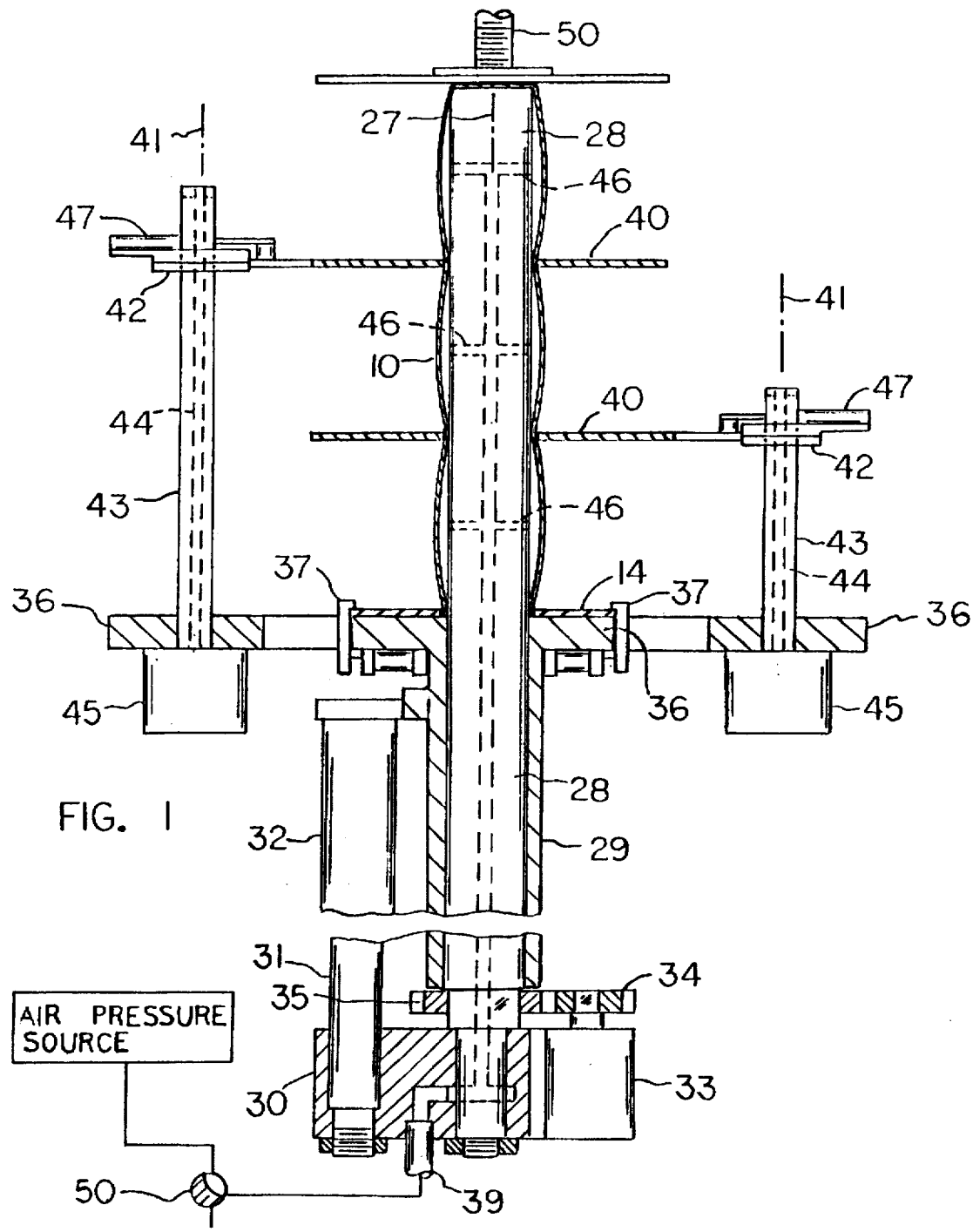
FIG. 1 is a semi-schematic elevational view of an apparatus that can be used to practice the method of the present invention.

FIG. 5 shows an airbag 10 in a folded condition within a bag housing 12 that comprises a circular mounting disc 14 for anchoring the mouth of the bag in a stationary position. Annular mouth edge 16 of the airbag is secured to the inner annular edge of disc 14 to closely fit around the cylindrical side surface of a conventional airbag inflator 18.

The inflator housing has a ring of gas escape ports 20 in its side surface, whereby pressurized gas flows from the inflator radially outwardly in essentially all directions into the bag interior space. The bag is thereby inflated from the folded deflated condition shown in full lines to the inflated condition shown in dashed lines 22. Typically, the inflation process is accomplished in a time span of about thirty five milliseconds. During the inflation process the bag expands out of bag housing 12 in all directions, measured around the axis of inflator 18, so that the bag has a curvilinear three dimentioned configuration of progressively increasing size during the process.

In its folded state the bag has plural annular folds 24 surrounding inflator 18 in an accordion-like configuration. The leading end wall 26 of the folded bag serves as a connector wall spanning the annular folds 24 on the end surface of inflator 18. Gas pressure is applied to connector wall 26, so that wall 26 moves generally axially away from the bag housing, as indicated by arrow 19. Connector wall 26 pulls the folded areas 24 of the bag out of the bag housing while the folded areas are unfolding, so that the bag maintains a three dimensional shape as it expands to the final configuration represented by numeral 22. The expansion process is controlled and predictable.

A special advantage of the FIG. 5 bag configuration is that the annular folds 24 surround the inflator 18, whereby the axial dimension of the bag-inflator assembly is relatively small. The assembly takes up a comparatively small axial space in the steering wheel.

The present invention is concerned particularly with a method of folding the airbag into the FIG. 5 folded configuration. FIGS. 1 through 4 show an apparatus that can be used to practice the method.

FIG. 1 shows an apparatus that includes a cylindrical mandrel 28 supported for slidable motion in a stationary tubular guide 29. The lower end of mandrel 28 is located within a head structure 30 that is affixed to the piston rod 31 of a fluid cylinder 32. The cylinder can be selectively pressurized at its upper or lower end to move piston rod 31 down or up, thereby lowering or raising the mandrel 28.

An electric motor (or fluid motor) 33 is mounted on head structure 30 for rotating mandrel 28 a limited distance around the mandrel longitudinal axis. The motor shaft carries a pinion gear 34 that is in mesh with a second pinion gear 35 carried by mandrel 28, whereby motor rotation powers the mandrel for rotary motion. Motor 33 is a reversible motor, so that the mandrel can be rotated clockwise or counterclockwise.

A pressurized air source is provided for assisting the apparatus to balloon selected areas of airbag 10 radially outwardly when the bag is positioned on mandrel 28. The illustrated pressurized air source comprises a hose 39 that connects to a passage system in head structure 30 and mandrel 28, whereby pressurized air can be discharged through radial ports 46 in mandrel 28 into interior areas of an airbag 10 that is positioned around the mandrel. Air flow through ports 46 helps to balloon selected areas of the bag outwardly to the condition of FIG. 4.

FIG. 1 shows mandrel 28 in its raised position extending upwardly through a stationary platform 36. With the mandrel 28 lowered so that its upper end is located at or below the plane of platform 36, the airbag 10 can be loaded into the apparatus to initiate a bag folding operation. Mounting disc 14 of the airbag is placed on the platform and held in position by suitable cylinder-operated clamps 37.

Fluid cylinder 32 is energized to raise mandrel 28 to its FIG. 1 position, wherein airbag 10 is stretched axially along the mandrel axis. The bag stretching action causes axial folds to be formed longitudinally in the bag wall, i.e. vertically at circumferentially spaced points around the mandrel surface.

The apparatus comprises two sets of clamping plates 40 arranged to move in horizontal planes normal to the axis of mandrel 28 for restraining selected areas of the bag against radial expansion away from the mandrel. Each set of plates comprises two plates movable around a mounting axis 41 located to the left or right of mandrel 28, so that the plates in each set can move edgewise toward the bag central axis 27 to loosely clamp localized areas of the bag wall against mandrel 28. The clamping plates act to restrain the bag material against radial expansion away from the mandrel.

As shown in the drawing, there are two sets of clamping plates 40 arranged to exert restraining forces on the bag material at axially spaced restraining planes along the length of mandrel 28. Each set of plates exerts a localized restraining force on the bag, preventing radial expansion of the clamped bag area.

The plates 40 in each set have overlapping face areas encircling a common collar 42 that is slidable vertically on a stationary guide channel 43; collar 42 serves as a pivotable mount for each plate 40, whereby each plate can swing around the collar axis 41. A rotary screw 44, powered by motor 45, extends vertically through a threaded opening in collar 42 (within channel 43), whereby collar 42 can move up or down on guide channel 43, depending on the rotational direction of motor 45. The plates 40 in each set can be opened or closed on mandrel 28 by two fluid cylinders 47 mounted on the upper face of collar 42.

Figure 2:
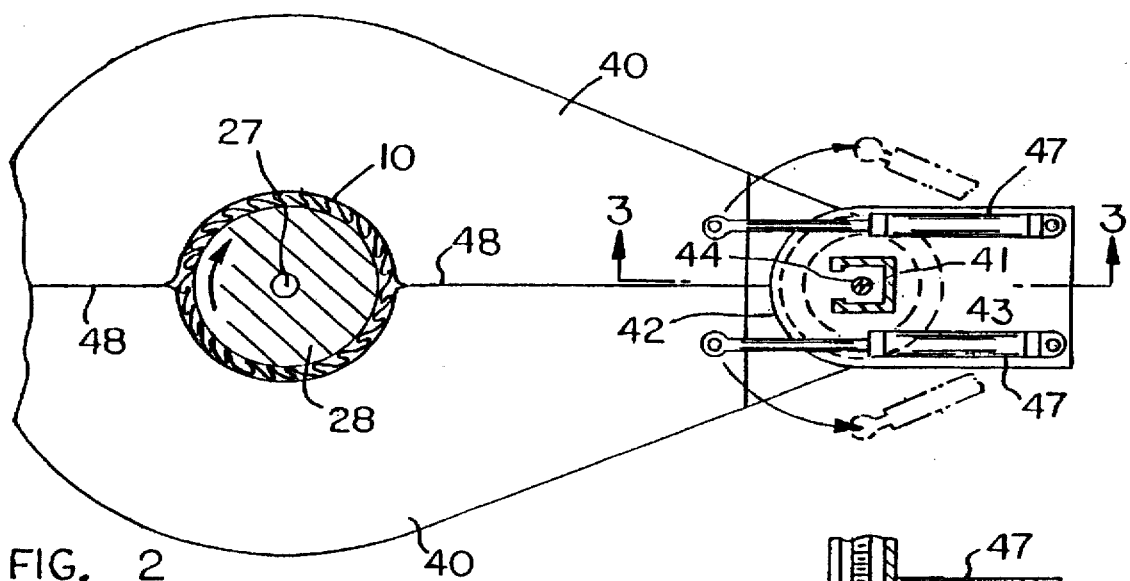
FIG. 2 is a fragmentary transverse sectional view taken through the FIG. 1 apparatus.
Figure 3:
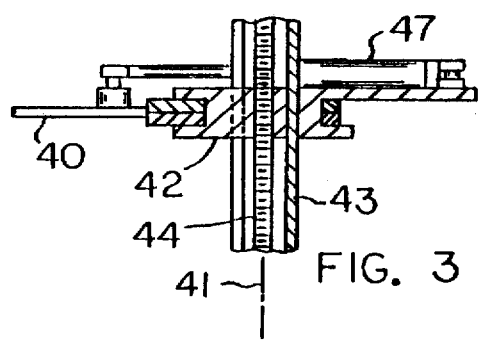
FIG. 3 is a fragmentary sectional view taken on line 3—3 in FIG. 2.

After bag 10 has been stretched axially (by moving mandrel 28 upwardly through platform 36) fluid cylinders 47 are operated to swing the associated plates 40 to the clamped positions wherein localized areas of bag 10 are clamped to mandrel 28. FIG. 2 shows two representative plates 40 in their clamped (closed) positions. As the concave arcuate edge surfaces of plates 40 contact the longitudinal folds of the airbag, the motor 33 on head structure 30 is energized to rotate mandrel 28 a limited arcuate distance around central axis 27. This has the effect of pulling bag material out of the joint that is formed by the confronting straight edges 48 of plates 40. The plates can thus fully close on the bag material, while any bag material proximate to edges 48 is precluded from being pinched in the joint between edges 48. At the same time the pleated areas of the bag gripped by plates 40 are rotated slightly as shown in FIG. 2, to minimize the pleat thickness in the clamping plane. The arcuate edges of plate 40 exert a relatively light grip force on the bag so that mandrel 28 can slide axially along the bag surface.

When the bag has been restrained against radial expansion, by the clamping action of plates 40, the bag is collapsed axially downwardly toward platform 36. At the same time the unrestrained areas of the bag are ballooned radially outwardly to form annular folds in the bag wall.

Axial (downward) collapse of bag 10 is accomplished by energizing cylinder 32 so that mandrel 28 is move downwardly through tubular guide 29. Simultaneously a downward pushing force is applied by an overhead shaft 50. A power means (e.g. a motor-operated nut) moves shaft 50 downwardly at the same rate as cylinder 32, whereby shaft 50 applies sufficient downward force so that the bag follows the mandrel as the mandrel is moved downwardly by cylinder 32.

Figure 4:
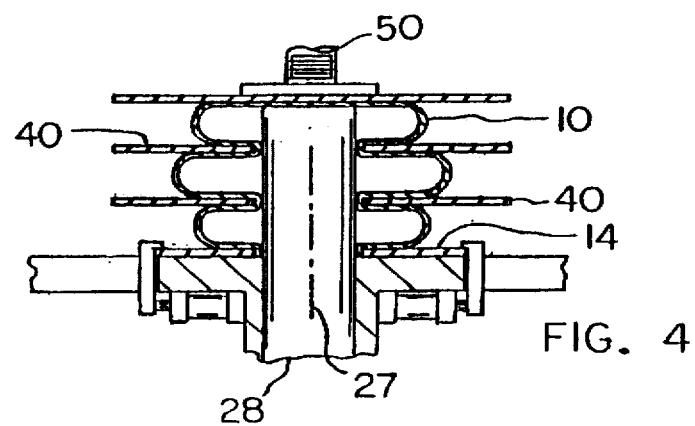
FIG. 4 is a fragmentary view of the FIG. 1 apparatus, taken when the bag is in a partially folded stage.

Motors 45, 45 are operated along with cylinder 32, so that each set of clamping plates 40 is moved downwardly along with mandrel 28. The bag restraining planes are thus shifted toward one another, as shown in FIG. 4, to permit intervening areas of the bag to balloon radially outwardly.

Pressurized air flow through ports 46 assists the ballooning action during the initial portion of mandrel movement in the downward direction. Air flow through ports 46 is discontinued prior to the FIG. 4 condition, since it is then unnecessary to pressurize the bag interior in order to produce annual folds in the bag. A control valve 50 can be actuated to vent pressurized air out of the bag, via hose 39, when the bag folds start to come together.

The mandrel is moved downwardly until the upper and lower restraining plates are in close proximity to one another. Plates 40 are then opened (by actuating cylinders 47) to permit the folded bag structure to be removed from platform 36.

Mandrel 28 has a diameter that is approximately the same as the diameter of inflator 18 (FIG. 5), whereby the folded airbag can be assembled around the inflator without disturbing the accordion folds formed in the bag by the apparatus of FIGS. 1 through 4. The folded bag has a single fold connector wall 26 adapted to lie against the end wall of inflator 18, such that the overall axial dimension of the bag-inflator assembly can be relatively small.

The apparatus of FIGS. 1 through 4 operates so that the bag 10 is collapsed axially by moving mandrel 28 downwardly within the stationary tubular guide 29. However, the same effect could be achieved by moving platform 36 upwardly (to produce a relative motion of the mandrel). Other variations and changes can be made in the apparatus used to practice the invention. The bag folding method of the invention can be practiced with various types of apparatus.

What is claimed:

1. A method of folding a vehicle safety airbag wherein said bag has an open mouth, said method comprising:

providing an elongated mandrel having a central longitudinal axis;

anchoring said bag at the bag mouth in a fixed position;

moving the mandrel into the bag to stretch the bag along the mandrel axis;

restraining spaced localized areas of the bag against expansion away from the mandrel central axis by moving plural sets of clamping plates edgewise toward the central axis to clamp the localized areas to the mandrel;

rotating the mandrel around the central axis while the clamping plates are moving the localized areas of the bag into contact with the mandrel, whereby the localized areas of the bag are prevented from being pinched between confronting edges of the clamping plates;

ballooning unrestrained areas of the bag outwardly away from the central axis to form respective ballooned areas;

moving the mandrel out of the bag and along the central axis to collapse the bag along said axis, while simultaneously moving the clamping plates toward one another and along a direction parallel to the central axis; and then withdrawing the clamping plates away from the central axis when the ballooned areas of the bag occupy essentially parallel planes normal to the central axis so as to form the folded vehicle safety airbag.

2. The method of claim 1 wherein the step of ballooning unrestrained areas of the bag outwardly is accomplished by blowing air outwardly from the mandrel into the bag.

3. The method of claim 1 wherein the step of ballooning unrestrained areas of the bag outwardly is accomplished by blowing air outwardly from the mandrel into the bag at plural spaced locations along the mandrel.

4. A method of folding a vehicle safety airbag, wherein the bag has a mouth connected to an annular mounting disk, said method comprising:

providing an elongated mandrel having a central longitudinal axis;

anchoring the bag mounting disk in a fixed position;

moving the elongated mandrel through the bag mouth into the bag so that the mandrel stretches the bag along the mandrel central axis;

loosely clamping localized areas of the bag to the mandrel along plural spaced planes normal to said central axis, so that the localized bag areas are restrained against expanding radially away from the central axis by restraining forces;

collapsing the bag by moving the mandrel out of the bag and along the mandrel axis while maintaining the localized restrained areas of the bag in position on the mandrel while simultaneously moving the restraining planes toward one another and along a direction parallel to the central axis;

ballooning unrestrained areas of the bag outwardly away from the central axis during the step of collapsing the bag; and then withdrawing the restraining forces away from the central axis when the unrestrained areas of the bag have been formed into relatively flat folds extending normal to the bag central axis, whereby the flat folds are retained so as to form the folded vehicle safety airbag.

5. The method of claim 4 and further comprising the step of rotating the mandrel around the central axis during the step of clamping localized areas of the bag to the mandrel, whereby the localized areas of the bag are prevented from being pinched during the clamping step.

6. The method of claim 5, wherein the step of ballooning unrestrained areas of the bag outwardly is accomplished by blowing air outwardly from the mandrel into the bag at plural spaced locations along the mandrel.

7. A method of folding a vehicle safety airbag, wherein the bag has a mouth connected to an annular mounting disk, said method comprising:

providing an elongated mandrel having a central longitudinal axis and a cylindrical side surface concentric around said axis;

anchoring the bag mounting disk in a fixed position;

moving the elongated mandrel through the bag mouth into the bag so that the mandrel stretches the bag along the mandrel central axis;

loosely clamping localized areas of the bag to the mandrel side surface so that the localized bag areas are restrained against expanding away from the central axis;

collapsing the bag by moving the mandrel out of the bag and along the central axis while simultaneously moving the loosely clamped areas of the bag toward one another and along a direction parallel to the central axis;

ballooning unrestrained areas of the bag outwardly away from the central axis by blowing air outwardly from the mandrel into the bag at plural spaced locations along the mandrel; and then unclamping the localized bag areas from the mandrel side surface when the unrestrained areas of the bag have been formed into relatively flat folds extending normal to the bag central axis, whereby the flat folds are retained so as to form the folded vehicle safety airbag.

* * * * *